United States Patent
Miya et al.

(10) Patent No.: US 10,118,734 B2
(45) Date of Patent: Nov. 6, 2018

(54) BLOW-MOLDED CONTAINER WITH IN-MOLD LABEL AND METHOD FOR MANUFACTURING BLOW-MOLDED CONTAINER WITH IN-MOLD LABEL

(71) Applicants: Takashi Miya, Tokyo (JP); Masafumi Fujita, Matsudo (JP)

(72) Inventors: Takashi Miya, Tokyo (JP); Masafumi Fujita, Matsudo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 15/127,935

(22) PCT Filed: Mar. 6, 2015

(86) PCT No.: PCT/JP2015/056711
§ 371 (c)(1),
(2) Date: Sep. 21, 2016

(87) PCT Pub. No.: WO2015/166709
PCT Pub. Date: Nov. 5, 2015

(65) Prior Publication Data
US 2017/0107016 A1    Apr. 20, 2017

(30) Foreign Application Priority Data

Apr. 30, 2014 (JP) .................. 2014-093547

(51) Int. Cl.
*B65D 23/08* (2006.01)
*B29C 49/24* (2006.01)
(Continued)

(52) U.S. Cl.
CPC .............. *B65D 23/08* (2013.01); *B29C 49/24* (2013.01); *B29C 49/2408* (2013.01); *B65D 1/02* (2013.01);
(Continued)

(58) Field of Classification Search
CPC .............. B29C 2049/241; B29C 49/24; B29C 45/14811; B29C 2049/2412; B29C 49/04
See application file for complete search history.

(56) References Cited

U.S. PATENT DOCUMENTS 5,254,302 A * 10/1993 Yamanaka ................ G09F 3/04
156/209
5,344,305 A   9/1994 McKillip
(Continued)

FOREIGN PATENT DOCUMENTS

EP   2843647 A1   3/2015
JP   H02-108516 A   4/1990
(Continued)

OTHER PUBLICATIONS

May 26, 2016 International Search Report issued in International Patent Application No. PCT/JP2015/056711.
(Continued)

*Primary Examiner* — Shawn M Braden
(74) *Attorney, Agent, or Firm* — Oliff PLC

(57) ABSTRACT

A blow-molded container includes a container body having a body portion that forms a square shape in a cross-sectional view orthogonal to a container axis; and in-mold labels, which are integrally glued on outer peripheral surfaces of glued portions, ranging from corner surfaces to respective planar portions continuing on both sides of corner surfaces around the container axis, in body portion. Among front and back surfaces of in-mold labels, multiple recesses are formed over entire back surfaces, which are glued to the outer peripheral surfaces of the glued portions. When tensile elasticity of in-mold labels is E (MPa) and thickness of in-mold labels is t (mm), $Ext^3$ is 0.20 or less. When the radius of curvature of the corner surfaces is R (mm) and angle formed between the planar portions is θ (°) in a (Continued)

cross-sectional view of the glued portions, $R \times \theta^2$ is 45000 or more.

6 Claims, 5 Drawing Sheets

(51) Int. Cl.
*B65D 23/00* (2006.01)
*B65D 1/02* (2006.01)
*B29K 23/00* (2006.01)
*B29K 105/00* (2006.01)
*B29L 31/00* (2006.01)

(52) U.S. Cl.
CPC ........... *B65D 1/0246* (2013.01); *B65D 23/00* (2013.01); *B29C 2049/2412* (2013.01); *B29C 2049/2433* (2013.01); *B29K 2023/065* (2013.01); *B29K 2023/12* (2013.01); *B29K 2105/258* (2013.01); *B29K 2995/0026* (2013.01); *B29L 2031/712* (2013.01)

(56) References Cited

U.S. PATENT DOCUMENTS

| | | | |
|---|---|---|---|
| 5,968,443 A | 10/1999 | Robles et al. | |
| 8,557,161 B2* | 10/2013 | Mizukoshi | B29C 45/0046 |
| | | | 264/279.1 |
| 9,114,905 B2* | 8/2015 | Kraus | B29C 45/1418 |
| 2004/0026438 A1 | 2/2004 | Tyra et al. | |
| 2009/0120329 A1* | 5/2009 | Kurz | C04B 28/02 |
| | | | 106/639 |
| 2014/0120329 A1* | 5/2014 | Hu | B32B 7/02 |
| | | | 428/201 |

FOREIGN PATENT DOCUMENTS

| | | |
|---|---|---|
| JP | H02-139327 A | 5/1990 |
| JP | H05-254528 A | 10/1993 |
| JP | H06-64029 A | 3/1994 |
| JP | H10-175625 A | 6/1998 |
| JP | 2000-254962 A | 9/2000 |
| JP | 2001-353770 A | 12/2001 |
| JP | 2004-136486 A | 5/2004 |
| JP | 2009-064295 A | 3/2009 |
| JP | 2009-241990 A | 10/2009 |
| JP | 2011-150149 A | 8/2011 |
| JP | 2012-116505 A | 6/2012 |
| JP | 2013-242513 A | 12/2013 |
| WO | 2011/152171 A1 | 12/2011 |

OTHER PUBLICATIONS

Sep. 12, 2017 Office Action issued in Japanese Patent Application No. 2014-093547.
Dec. 1, 2017 Search Report issued in European Patent Application No. 15786172.5.

* cited by examiner

BLOW-MOLDED CONTAINER WITH IN-MOLD LABEL AND METHOD FOR MANUFACTURING BLOW-MOLDED CONTAINER WITH IN-MOLD LABEL

TECHNICAL FIELD

The present invention relates to a blow-molded container with an in-mold label and a method for manufacturing a blow-molded container with an in-mold label.

Priority is claimed on Japanese Patent Application No. 2014-093547, filed Apr. 30, 2014, the content of which is incorporated herein by reference.

BACKGROUND ART

In the related art, for example, a blow-molded container with an in-mold label in which in-mold labels are glued on an outer peripheral surface of the container body, as shown in the following Patent Document 1, is known. This container is formed by arranging the in-mold labels within a cavity of molds together with a preliminary molded body and blow-molding the preliminary molded body, thereby forming a container body and gluing the in-mold labels on an outer peripheral surface of a body portion.

CITATION LIST

Patent Document

[Patent Document 1] Japanese Unexamined Patent Application, First Publication No. 2004-136486

SUMMARY OF INVENTION

Technical Problem

In the related art, in a case where the body portion of the container body forms a square shape in which planar portions and corner surfaces are alternately and continuously provided around a container axis in a cross-sectional view orthogonal to the container axis, generally, the in-mold labels are glued only on the planar portions of the body portions.

However, in this case, the display area of the in-mold labels may be narrow, and the size, the amount of information, and the like of characters, illustrations, and the like may be limited.

Thus, if the in-mold labels are integrally glued on portions ranging from the corner surfaces to respective planar portions continuing on both sides of the corner surfaces around the container axis, in an outer peripheral surface of the body portion, there is a problem in that so-called air collection in which gas is sealed between the corner surfaces and the in-mold labels occurs easily.

The invention has been made in consideration of such circumstances, and an object thereof is to provide a blow-molded container with an in-mold label and a method for manufacturing a blow-molded container with an in-mold label in which air collection can be made difficult to occur between corner surfaces and the in-mold labels.

Solution to Problem

In order to solve the above problems and achieve such an object, a blow-molded container with an in-mold label of the invention includes a container body having a body portion that forms a square shape in which planar portions and corner surfaces are alternately and continuously provided around a container axis, in a cross-sectional view orthogonal to the container axis; and in-mold labels, which are integrally glued on outer peripheral surfaces of glued portions, ranging from the corner surfaces to the respective planar portions continuing on both sides of the corner surfaces around the container axis, in the body portion. Additionally, among front and back surfaces of the in-mold labels, multiple recesses are formed over the entire back surfaces, which are glued to the outer peripheral surfaces of the glued portions, when the tensile elasticity of the in-mold labels is E (MPa) and the thickness of the in-mold labels is t (mm), $E \times t^3$ is 0.20 or less, and, when the radius of curvature of the corner surfaces is R (mm) and the angle formed between the planar portions is $\theta$ (°) in a cross-sectional view of the glued portions, $R \times \theta^2$ is 45000 or more.

Additionally, a method for manufacturing a blow-molded container with an in-mold label of the invention is a method for manufacturing a blow-molded container with an in-mold label including a container body having a body portion that forms a square shape in which planar portions and corner surfaces are alternately and continuously provided around a container axis, in a cross-sectional view orthogonal to the container axis; and in-mold labels, which are integrally glued on outer peripheral surfaces of glued portions, ranging from the corner surfaces to the respective planar portions continuing on both sides of the corner surfaces around the container axis, in the body portion. The method includes a setting process of arranging a preliminary molded body and the in-mold labels within a cavity; and a blow-molding process of blow-molding the preliminary molded body to form the container body and gluing the in-mold labels on the outer peripheral surfaces of the glued portions. Additionally, among front and back surfaces of the in-mold labels, multiple recesses are formed over the entire back surfaces, which are glued to the outer peripheral surfaces of the glued portions, when the tensile elasticity of the in-mold labels is E (MPa) and the thickness of the in-mold labels is t (mm), $E \times t^3$ satisfies 0.20 or less, and, when the radius of curvature of the corner surfaces is R (mm) and the angle formed between the planar portions is $\theta$ (°) in a cross-sectional view of the glued portions, $R \times \theta^2$ is 45000 or more.

According to the invention, the multiple recesses are formed on the back surfaces of the in-mold labels. Thus, when the in-mold labels bend, the volume of the recesses located in these portions decreases. Therefore, the in-mold labels not only can be made easily made to conform to the external shape of the above glued portions of the body portion, but also can be inhibited from thermally contracting when heated due to the temperature of the preliminary molded body when the container body is molded.

From the above, when the in-mold labels are glued on the outer peripheral surfaces of the above glued portions, the in-mold labels can be naturally deformed along the above glued portions, and the in-mold labels can be glued on the above glued portions without causing air to collect between the in-mold labels and the corner surfaces.

Particularly, in a cross-sectional view in the above glued portions, when the curvature radius of the corner surfaces is R (mm) and the angle formed between planar portions adjacent to each other around the container axis is $\theta$ (°), $R \times \theta^2$ is 45000 or more. For example, the curvature radius R of the corner surfaces becomes greater as the angle $\theta$ formed between the planar portions adjacent to each other around the container axis becomes a smaller acute angle. Thus, the corner surfaces bend gently in the above cross-sectional view, and a long length thereof in the circumferential direction is easily secured, and it is possible to easily deform the in-mold labels along the outer peripheral surfaces of the above glued portions. As a result, air collection can be reliably inhibited from occurring in the labels at the time of the gluing of the in-mold labels.

Additionally, the multiple recesses are formed in the back surfaces of the in-mold labels. Thus, in blow molding, not only can the air between the container body or the preliminary molded body and the in-mold labels easily escape to the outside through the recesses, but also it is possible to house the air, which could not have escaped, within the recesses, and occurrence of air collection can be more reliably suppressed.

Here, in the blow-molded container with an in-mold label of the invention, the depth of the recesses may be 0.01 mm or more, and the proportion of the total plane area occupied by the multiple recesses of the in-mold labels may be 10% or more.

Additionally, in the method for manufacturing a blow-molded container with an in-mold label of the invention, the proportion of the total plane area occupied by the multiple recesses of the in-mold labels may be 10% or more, and the depth of the recesses may be 0.02 mm or more in a state before the in-mold labels are glued on an outer peripheral surface of the body portion.

In these cases, air collection can be reliably made difficult to occur between the corner surfaces and the in-mold labels.

Additionally, in the method for manufacturing a blow-molded container with an in-mold label of the invention, corresponding portions glued on outer peripheral surfaces of the corner surface in the in-mold labels may be stuck on an inner surface of the cavity in the blow molding process.

In this case, since the corresponding portions of the in-mold labels are stuck on the inner surface of the cavity in the blow molding process, the positions of the corresponding portions with respect to the inner surface of the cavity are fixed in the blow molding process. Therefore, air collection can be more reliably inhibited from occurring between the corner surfaces and the in-mold labels.

Advantageous Effects of Invention

According to the invention, a blow-molded container with an in-mold label in which air collection does not easily occur between the corner surfaces and the in-mold labels can be manufactured.

DESCRIPTION OF EMBODIMENTS

Hereinafter, a blow-molded container 1 with an in-mold label related to an embodiment of the invention will be described with reference to the drawings.

Figure 1A:
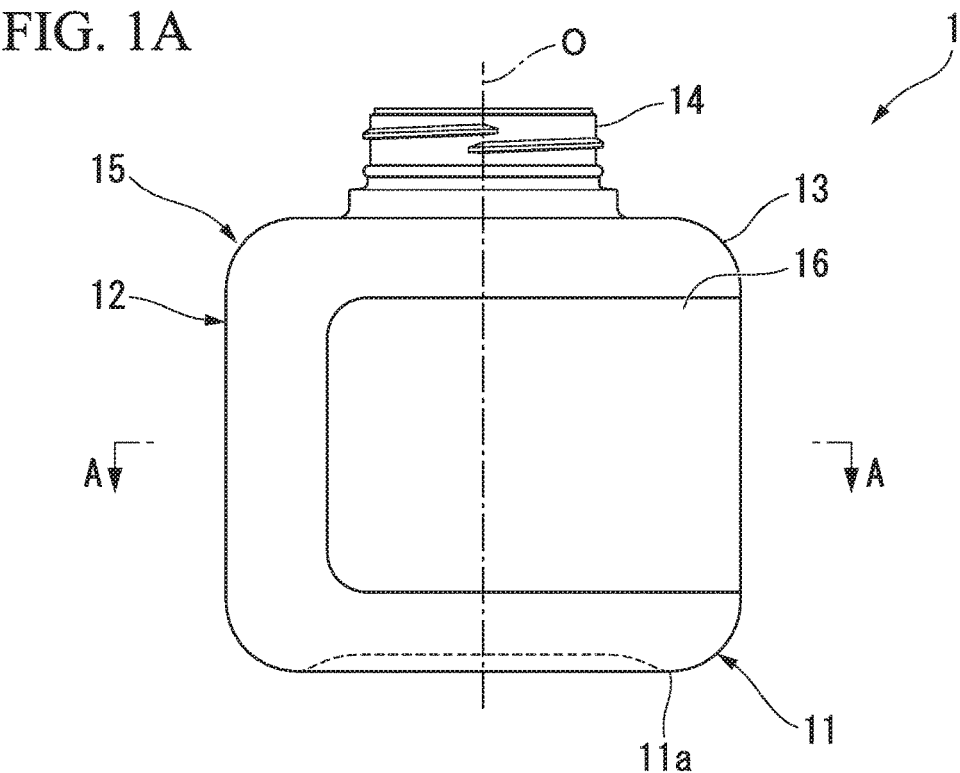
FIG. 1A is a side view of a blow-molded container with an in-mold label shown as one embodiment related to the invention.
Figure 1B:
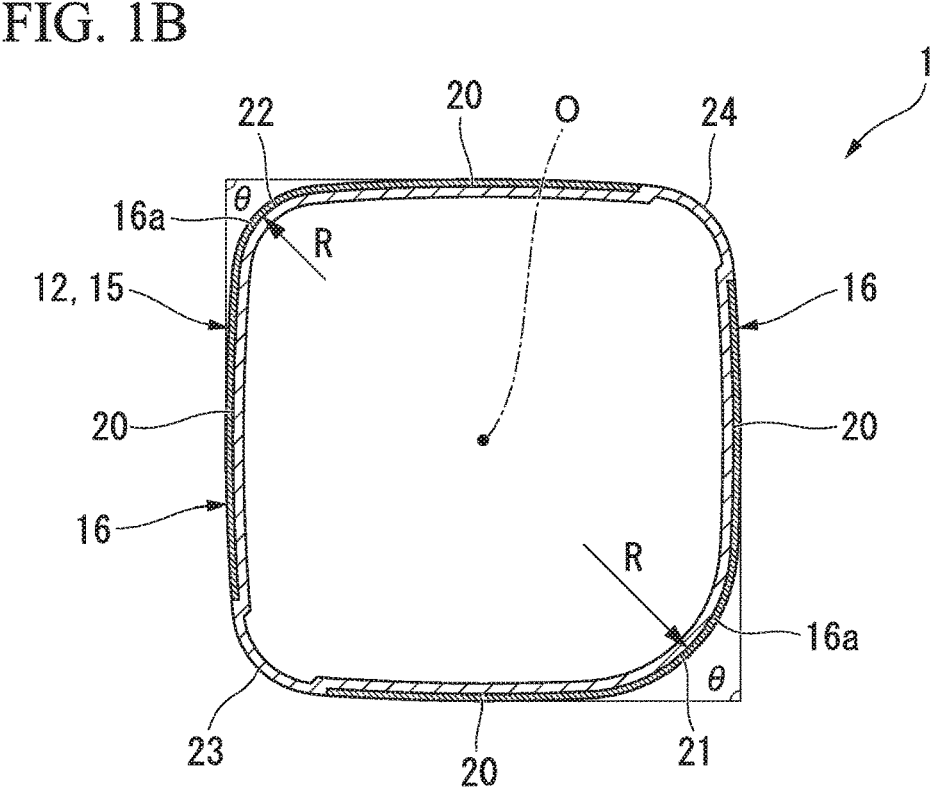
FIG. 1B is a sectional view as seen in the direction of an arrow on line A-A of FIG. 1A.

A blow-molded container 1 with an in-mold label of the present embodiment, as shown in FIGS. 1A and 1B, includes a container body 15 in which a bottom portion 11, a body portion 12, a shoulder portion 13, and a mouth portion 14 are continuously provided in this order, and an in-mold label 16 glued on the body portion 12.

Respective central axes of the bottom portion 11, the body portion 12, the shoulder portion 13, and the mouth portion 14 in the container body 15 are arranged coaxially with a common axis. Hereinafter, this common axis is referred to as a container axis O, a bottom portion 11 side in the direction of the container axis O is referred to as a lower side, and a side opposite to this lower side is referred to as an upper side. Additionally, in a plan view as seen from the direction of the container axis O, a direction orthogonal to the container axis O is referred to as a radial direction, and a direction going around the container axis O is referred to as a circumferential direction.

The container body 15 is integrally formed of, for example, synthetic resin materials, such as high-density polyethylene resin or polypropylene resin. In addition, the container body 15 has an internal capacity of, for example, about 370 ml.

A peripheral wall portion of the bottom portion 11 is formed in the shape of a curved surface that protrudes toward a radial outer side, and gradually extends upward from a grounding portion 11a toward the radial outer side.

The shoulder portion 13 couples an upper end of the body portion 12 and a lower end of the mouth portion 14 together, is formed in the shape of a curved surface that protrudes toward the radial outer side, and gradually extends toward a radial inner side upward from below.

The body portion 12 extends straight over the entire length in the direction of the container axis O. Additionally the body portion 12 forms a square shape in which planar portions 20 and corner surfaces 21, 22, 23, and 24 are alternately and continuously provided around the container axis O, in a cross-sectional view orthogonal to the container axis O.

In the shown example, the body portion 12 forms a rectangular shape in the above cross-sectional view. In addition, the body portion 12 forms a rectangular shape of which one side is about 75 mm in the above cross-sectional view. The planar portions 20 are slightly curved so as to protrude toward the radial outer side. In addition, the planar portions 20 may extend straight in the above cross-sectional view.

The corner surfaces 21 to 24 are formed in the shape of a curved surface that protrudes toward the radial outer side. In the above cross-sectional view, the curvature radius R of the corner surfaces 21 to 24 is smaller than the curvature radius of the planar portions 20.

In the present embodiment, in the cross-sectional view of the body portion 12, when the curvature radius of the corner surfaces 21 to 24 is R (mm) and an angle formed between the planar portions 20 adjacent to each other around the container axis O is $\theta$ (°), $R \times \theta^2$ is 45000 or more.

In addition, for example, the curvature radius R is about 4 mm to 40 mm, and the angle $\theta$ is about 45° to 135°.

In the shown example, the curvature radius of one corner surface (hereinafter referred to as a maximum corner surface) 21 of the four corner surfaces 21 to 24 R is greater than that of the other three corner surfaces 22 to 24, and the curvature radius R of the maximum corner surface 21 is, for example, about 22 mm, the curvature radius R of the other three corner surfaces 22 to 24 is, for example, about 12.5 mm, and the angle $\theta$ is, for example, 90° between the planar portions 20 adjacent to each other around the container axis O. That is, $R \times \theta^2$ is 178200 in the maximum corner surface 21, and is 101250 in the other three corner surfaces 22 to 24.

Additionally, the distance from the container axis O in the radial direction is the shortest in the maximum corner surface 21 among the four corner surfaces 21 to 24.

In the shown example, in-mold labels 16 are respectively glued on portions ranging from the maximum corner surface 21 to respective planar portions 20 continuing on both sides of the maximum corner surface 21 around the container axis O, and portions ranging from the corner surface (hereinafter referred to as an opposite corner surface) 22 that faces the maximum corner surface 21 in the radial direction to respective planar portions 20 continuing on both sides of the opposite corner surface 22 around the container axis O, in an outer peripheral surface of the body portion 12. Hereinafter, respective portions on which the in-mold labels 16 are glued, in the outer peripheral surface of the body portion 12, are referred to as glued portions. In addition, the respective in-mold labels 16 are spaced apart from each other in the circumferential direction, and are glued at positions where a portioning line is avoided, in the outer peripheral surfaces of the body portion 12.

Multiple recesses 25 are formed on a back surface bonded on the outer peripheral surface of the body portion 12 out of front and back surfaces of each in-mold label 16 over its whole region. The multiple recesses 25 are formed with the same shape as each other in a plan view and with the same size as each other, and are arranged at equal intervals on the back surface of the in-mold label 16. The recesses 25 are formed in a square shape in the plan view, and are arranged on the back surface of the in-mold label 16 in a state where the recesses are aligned so that the portion of the back surface where the recesses 25 are not formed forms a lattice shape in the plan view. In addition, the aspect of the shape or arrangement of the recesses 25 may be appropriately changed without being limited to the present embodiment.

In a state where the in-mold label 16 is glued on the outer peripheral surface of the body portion 12, the depth of the recesses 25 is 0.01 mm or more and preferably 0.08 mm or less.

Meanwhile, in a state before the in-mold label 16 is glued on the outer peripheral surface of the body portion 12, the depth of the recesses 25 is 0.02 mm or more and preferably 0.10 mm or less, and the total of the internal volumes of all of a plurality of recesses 25 that are located in a unit region where a plane area is 1 cm$^2$, in the in-mold label 16, is, for example, about 0.001 cm$^3$ to 0.005 cm$^3$.

In addition, in a case where the depth of the recesses in a state where an in-mold label is glued on the outer peripheral surface of the body portion 12 exceeds 0.08 mm or in a case where the depth of the recesses in a state before an in-mold label is glued on the outer peripheral surface of the body portion 12 exceeds 0.10 mm, when in-mold labels are automatically supplied into a cavity C using a device, multiple sheets of bundled in-mold labels may not be able to be suctioned and taken out sheet by sheet, or printing to be performed on an in-mold label may become unclear, or portions except the recesses in an in-mold label may be reversed at the time of gluing onto the container body, may protrude to a front surface side of this label, and may damage the external appearance of a blow-molded container with an in-mold label.

Additionally, when the tensile elasticity of the in-mold label 16 is E (MPa) and the thickness of the in-mold label 16 is t (mm), $E \times t^3$ satisfies 0.20 or less, and preferably, 0.05 or more, the number of the recesses 25 that are located in a unit region where a plane area is 1 cm$^2$, in an in-mold label 16, is for example, about 25 pieces to 2500 pieces, and the proportion of the total plane area occupied by the multiple recesses 25 of the in-mold label 16 is 10% or more and preferably 70% or less.

In addition, the thickness t of the in-mold label 16 is, for example, about 0.04 mm to 0.10 mm. Additionally, the tensile elasticity E is, for example, about 110 MPa to 250 MPa.

Here, if $E \times t^3$ is less than 0.05, the rigidity of an in-mold label becomes two weak, the handling thereof becomes difficult, and the in-mold label is not easily set in molds 31 and 32 to be described below. If the proportion of the total plane area of multiple recesses that occupies the plane area of an in-mold label exceeds 70%, the gluing area of the in-mold label with respect to the above glued portions may decrease and glue strength decrease, or when in-mold labels are automatically supplied into the cavity C using a device, multiple sheets of bundled in-mold labels may not be able to be suctioned and taken out sheet by sheet.

In addition, the thickness t of the in-mold label 16 was obtained by measuring portions of the label 16 where the recesses 25 are not formed. Additionally, the tensile elasticity E was measured by pulling a test piece, which is obtained by forming the in-mold label 16 in a shape based on ASTM D-1822-L, at a speed of 1 mm/1 minute.

Additionally, the numerical value of $E \times t^3$, the number of the recesses 25 included in the above unit region, and the proportion of the total plane area of the multiple recesses 25 that occupies the plane area of the in-mold label 16 do not vary substantially before and after the in-mold label 16 is glued on the body portion 12.

Additionally, through-holes (not shown) are discontinuously over the entire length in the direction of the container axis O in corresponding portions 16a glued on respective outer peripheral surfaces of the maximum corner surface 21 and the opposite corner surface 22 of the body portion 12 in each in-mold label 16.

Here, the in-mold label 16 includes the following four types of for example, type A, type B, type C, and type D.

Figure 2:
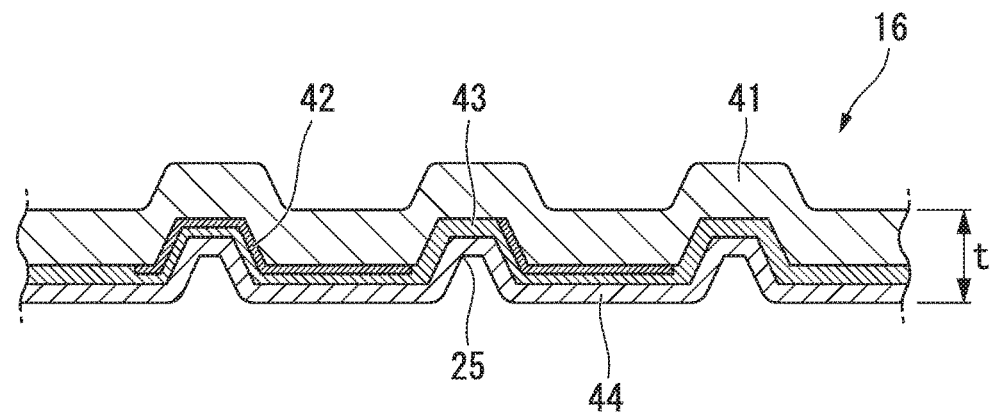
FIG. 2 is a sectional view in a thickness direction showing type A of an in-mold label of the blow-molded container with an in-mold label shown as the embodiment related to the invention.

In the in-mold label 16 of type A, as is shown in FIG. 2, a transparent base material layer 41 consisting of a non-extended cast film made of polypropylene resin, a printing layer 42, an anchor coat layer 43, and a glue layer 44 made of low-density polyethylene resin are laminated in this order from a front surface side toward a back surface side. In addition, the in-mold label 16 is formed so as to be sequentially laminated from the front surface side toward the back surface side.

The printing layer 42 is formed by, for example, gravure printing, screen printing, or flexographic printing being performed on a back surface side of the base material layer 41. The anchor coat layer 43 is formed of, for example, materials obtained by diluting polyethyleneimine, polyetherpolyol polysiocyanate, or polyesterpolyol polysiocyanate with water or an organic solvent. The glue layer 44 is formed by, for example, an extrusion laminating method being performed on a back surface side of the anchor coat layer 43. Additionally, the recesses 25 are formed by performing embossing in a back surface of the glue layer 44 after the glue layer 44 is cooled and solidified with a cooling roller. In this case, the recesses are formed not only in the glue layer 44 but also in the respective back surfaces of the base material layer 41, the printing layer 42, and the anchor coat layer 43, and protrusions are formed in the respective front surfaces of the base material layer 41, the printing layer 42, the anchor coat layer 43, and the glue layer 44 in correspondence with the recesses.

In addition, the thickness of the base material layer 41 is about 0.070 mm, and the thickness of the glue layer 44 is about 0.010 mm.

Figure 3:
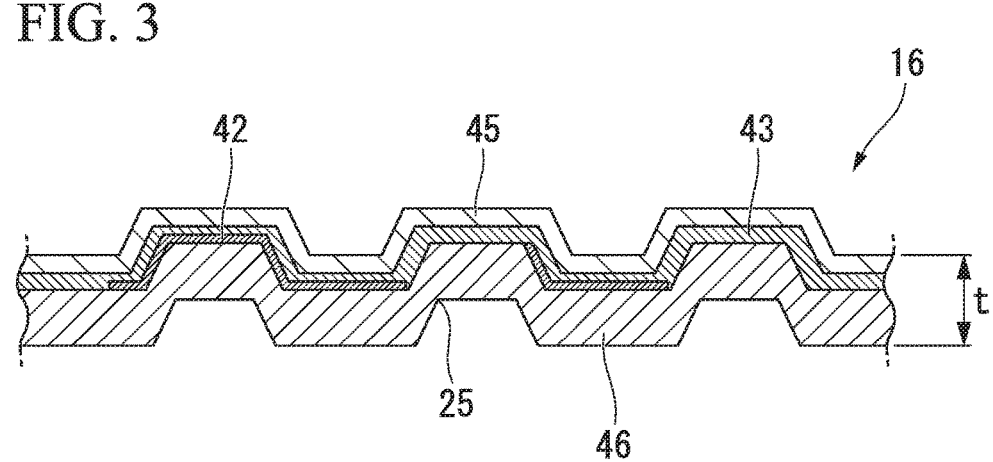
FIG. 3 is a sectional view in the thickness direction showing type B of the in-mold label of the blow-molded container with an in-mold label shown as the embodiment related to the invention.

In the in-mold label 16 of type B, as is shown in FIG. 3, a protective layer 45 made of low-density polypropylene resin, the anchor coat layer 43, the printing layer 42, and a glue layer 46 consisting of a non-extended cast film made of polyethylene resin are laminated in this order from a front surface side toward a back surface side. In addition, the in-mold label 16 is formed so as to be sequentially laminated from the back surface side toward the front surface side. The protective layer 45 is formed by, for example, an extrusion laminating method being performed on front surface side of the anchor coat layer 43.

Additionally, the recesses 25 are formed by performing embossing in a back surface of the glue layer 46 after the protective layer 45 is cooled and solidified with a cooling roller.

In this case, the recesses are formed not only in the glue layer 46 but also in the respective back surfaces of the protective layer 45, the anchor coat layer 43, and the printing layer 42, and protrusions are formed in the respective front surfaces of the protective layer 45, the anchor coat layer 43, the printing layer 42, and the glue layer 46 which are in correspondence with the recesses.

In addition, the thickness of the protective layer 45 is about 0.010 mm, and the thickness of the glue layer 46 is about 0.070 mm.

Figure 4:
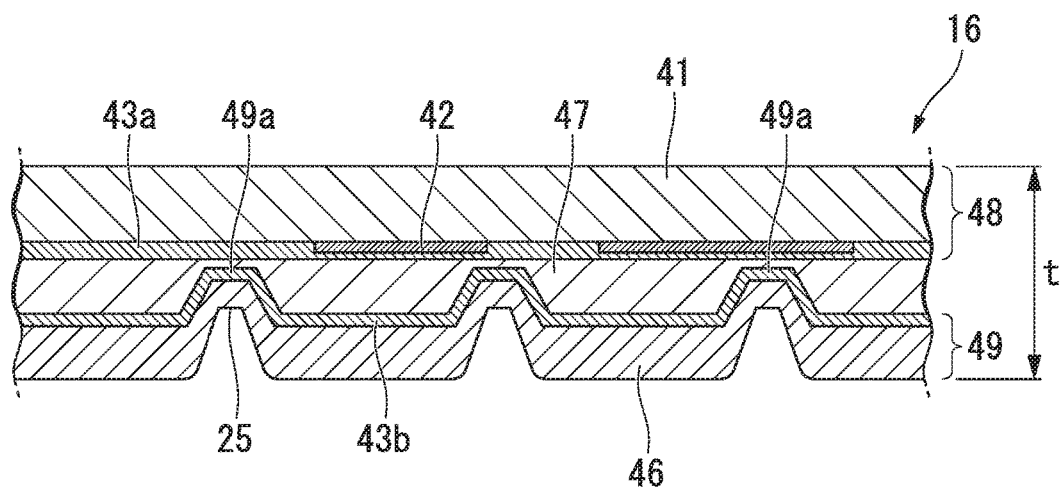
FIG. 4 is a sectional view in the thickness direction showing type C of the in-mold label of the blow-molded container with an in-mold label shown as the embodiment related to the invention.

In the in-mold label 16 of type C, as is shown in FIG. 4, the base material layer 41, the printing layer 42, a first anchor coat layer 43a, an extrusion resin layer 47 made of low-density polyethylene resin, a second anchor coat layer 43b, the glue layer 46 consisting of a non-extended cast film made of polypropylene resin are laminated in this order from a front surface side toward a back surface side.

The recesses 25 formed in the back surface of the glue layer 46 reach a front surface of the glue layer 46, front and back surfaces of the second anchor coat layer 43b, and even a back surface of the extrusion resin layer 47, and a front surface of the extrusion resin layer 47, the first anchor coat layer 43a, the printing layer 42, and the base material layer 41 are flat.

In addition, the in-mold label 16 is formed by the flat extrusion resin layer 47 in a softened state being sandwiched between a first film 48 including the base material layer 41, the printing layer 42, and the first anchor coat layer 43a and a second film 49 including the glue layer 46 where the recesses 25 are formed and the second anchor coat layer 43b and by projection portions 49a corresponding to the recesses 25 on the front surface side of the second film 49 being recessed into the extrusion resin layer 47.

Additionally, the first and second anchor coat layers 43a and 43b are formed of the same materials as the anchor coat layer 43 in type A and type B.

In addition, the thickness of the base material layer 41 is about 0.030 mm, and the thickness of the glue layer 46 is about 0.050 mm.

Figure 5:
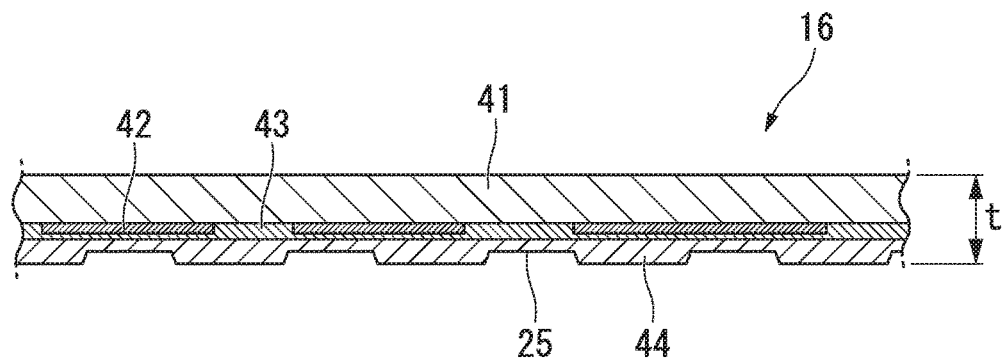
FIG. 5 is a sectional view in the thickness direction showing type D of the in-mold label of the blow-molded container with an in-mold label shown as the embodiment related to the invention.

In the in-mold label 16 of type D, as is shown in FIG. 5, the transparent base material layer 41, the printing layer 42, the anchor coat layer 43, and the glue layer 44 made of low-density polyethylene resin are laminated in this order from a front surface side toward a back surface side.

The depth of the recesses 25 falls within a thickness range of the glue layer 44, and the base material layer 41, the printing layer 42, and the anchor coal layer 43 are flat.

In addition, the in-mold label 16 is formed so as to be sequentially laminated from the front surface side toward the back surface side.

The recesses 25 are formed simultaneously when an embossing roll is made to abut against and cool the back surface of the glue layer 44 after the glue layer 44 is formed with a thickness of or example, about 0.005 mm to 0.030 mm by forming, for example, an extrusion laminating method on a back surface of the anchor coat layer 43. In addition, the thickness of the base material layer 41 is about 0.040 mm, and the thickness of the glue layer 44 is about 0.020 mm.

Additionally, in the in-mold labels 16 of types A, C, and D, the thickness of the base material layer 41 is, for example, about 0.03 mm to 0.08 mm.

Figure 6:
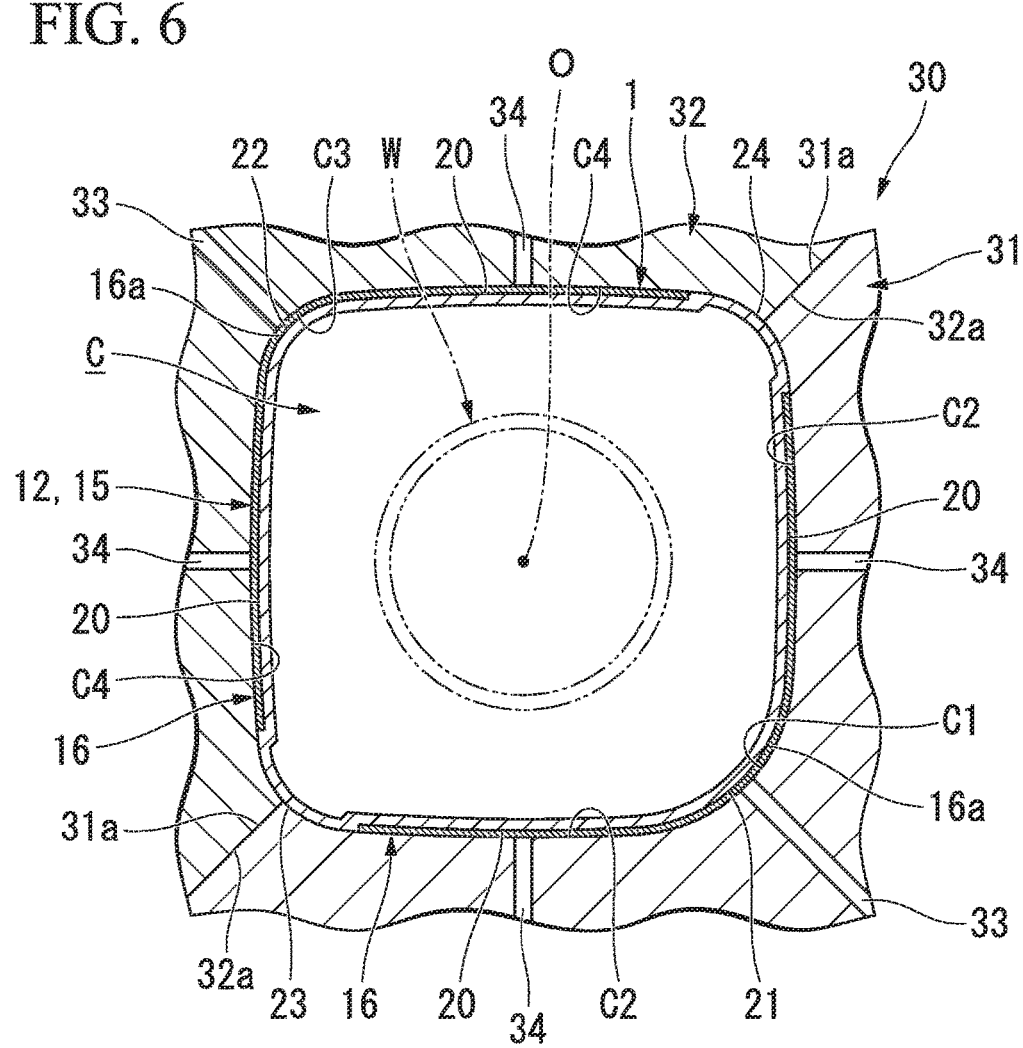
FIG. 6 is a sectional view of main portions of a molding mold of the blow-molded container with an in-mold label shown as the embodiment related to the invention.

Next, a molding mold 30 for manufacturing the blow-molded container 1 with an in-mold label configured as described above will be described with reference to FIG. 6.

The molding mold 30 includes an extruder (not shown) that extrusion-molds a cylindrical parison (preliminary molded body) W, and a pair of molds 31 and 32 that is provided so as to be capable of being brought closer to or separated from each other and has a cavity C, having the same inner surface shape as the outer surface shape of the container body 15 to be molded, formed between mold surfaces 31a and 32a in a mold clamping state.

In the shown example, the pair of molds 31 and 32 is disposed so that a portioning line is located in a diagonal portion where two corner surfaces 23 and 24 on which the in-mold labels 16 are not glued are located, among two sets of diagonal portions in the body portion 12 of the container body 15. First and second intake passages 33 and 34 that open to an inner surface of the cavity C are formed in the molds 31 and 32. The first and second intake passages 33 and 34 respectively open to a portion C1 that forms the maximum corner surface 21 of the body portion 12 of the container body 15, portions C2 that form the pair of planar portions 20 continuing on the maximum corner surface 21 in the circumferential direction, a portion C3 that forms the opposite corner surface 22, and portions C4 that form the pair of planar portions 20 continuing on the opposite corner surface 22 in the circumferential direction, in the inner surface of the cavity C. The first intake passages 33, which open to the portion C1 that forms the maximum corner surface 21 and the portion C3 that forms the opposite corner surface 22, in the inner surface of the cavity C, among the first and second intake passages 33 and 34, extend in the direction of the container axis O, and allow the in-mold labels 16 over the substantially entire length thereof in the direction of the container axis O to be suctioned therethrough.

Here, the length, in the direction of the container axis O, of the in-mold labels 16 suctioned by the first intake passages 33 may not be the entire length of the in-mold labels 16 in the direction of the container axis O as long as the length is such that the position of the corresponding portions 16a of the in-mold labels 16 with respect to the inner surface of the cavity C can be fixed in blow molding to be described below.

Next, a method for manufacturing the blow-molded container 1 with an in-mold label using the molding mold 30 configured as described above will be described.

First, an in-mold label 16 is integrally arranged from the portion C1 that forms the maximum corner surface 21 to the portions C2 that form the pair of planar portions 20 continuing on the maximum corner surface 21 in the circumferential direction, in the inner surface of the cavity C of the molds 31 and 32. Additionally, an in-mold label 16 that is separate from the above in-mold label is integrally arranged from the portion C3 that forms the opposite corner surface 22 to the portions C4 that form the pair of planar portions 20 continuing on the opposite corner surface 22 in the circumferential direction, in the inner surface of the cavity C of the molds 31 and 32. In this case, the in-mold labels 16 are stuck on the inner surface of the cavity C by applying a negative pressure to the respective in-mold labels 16 through the first and second intake passages 33 and 34. Here, the corresponding portion 16a, which is located in the portion C1 that forms the maximum corner surface 21 in the inner surface of the cavity C, and the corresponding portion 16a, which is located in the portion C3 that forms the opposite corner surface 22 in the inner surface of the cavity C, in the respective in-mold labels 16, are suctioned toward the inner surface of the cavity C over the substantially entire length thereof in the direction of the container axis O.

Then, the cylindrical parison W extrusion-molded from the extruder (not shown) is sandwiched between the pair of molds 31 and 32, and is located within the cavity C (setting process).

Next, the container body 15 is formed by blow-molding the parison W in a state where the pair of molds 31 and 32 are maintained in the mold clamping state, and the in-mold labels 16 are glued on the outer peripheral surface of the body portion 12 (blow molding process). In this process, a state where a negative pressure is applied to the in-mold labels 16 and the in-mold labels are stick on the inner surface of the cavity C are maintained. Additionally, in this case, the parison W is expanded and deformed only in the radial direction.

As described above, according to the blow-molded container 1 with an in-mold label and its manufacturing method related to the present embodiment, the multiple recesses 25 are formed on the back surfaces of the in-mold labels 16. Thus, when the in-mold labels 16 bends, the volume of the recesses 25 located in these portions decreases. Therefore, not only it becomes easy to make the in-mold labels 16 conform to the external shape of the above glued portions of the body portion 12, but also the labels 16 can be inhibited from thermally contracting when the in-mold labels 16 are heated due to the temperature of the parison W.

From above, when the in-mold labels 16 are glued on the outer peripheral surfaces of the above glued portions, the in-mold labels can be naturally deformed along the above glued portions, and the in-mold labels 16 can be glued on the above glued portions without causing air collection between the in-mold labels and the corner surfaces 21 and 22.

Particularly, in the cross-sectional view in the above glued portions, when the curvature radius of the corner surfaces 21 and 22 is R (mm) and the angle formed between the planar portions 20 adjacent to each other around the container axis O mutually make is $\theta$ (°), $R \times \theta^2$ is 45000 or more, and the curvature radius R of the corner surfaces 21 and 22 becomes greater as the angle $\theta$ formed between the planar portions 20 adjacent to each other around the container axis O becomes a smaller acute angle. Thus, the corner surfaces 21 and 22 gently bend in the above cross-sectional view, and a long length thereof in the circumferential direction is easily secured, and it is possible to easily deform the in-mold labels 16 along the outer peripheral surfaces of the above glued portions, and air collection can be reliably inhibited from occurring in the labels 16 at the time of the gluing of the in-mold labels 16.

Additionally, the multiple recesses 25 are formed in the back surfaces of the in-mold labels 16. Thus, in blow molding, not only the air between the container body 15 or the parison W and the in-mold labels 16 are easily escaped to the outside through the recesses 25, but also it is possible to house the air, which could not have escaped, within the recesses 25, and occurrence of air collection can be more reliably suppressed.

Additionally, since the proportion of the total plane area occupied by the multiple recesses 25 of the in-mold labels 16 is 10% or more, the depth of the recesses 25 is 0.02 mm or more in a state before the in-mold labels 16 are glued on the outer peripheral surface of the body portion 12 or is 0.01 mm or more in a state where the in-mold labels are glued, air collection can be reliably made difficult to occur between the corner surfaces 21 and 22 and the in-mold labels 16.

Additionally, since the corresponding portions 16a of the in-mold labels 16 are stuck on the inner surface of the cavity C in the blow molding process, the positions of the corresponding portions 16a to the inner surface of the cavity C are fixed in the blow molding process. As a result, air collection can be more reliably inhibited from occurring between the corner surfaces 21 and 22 and the in-mold labels 16.

Next, a verification test of the working effects described above will be described.

In this test, in-mold labels 111 of type E and type F were adopted in addition to the in-mold labels 16 of the aforementioned type A to type D.

Figure 7:
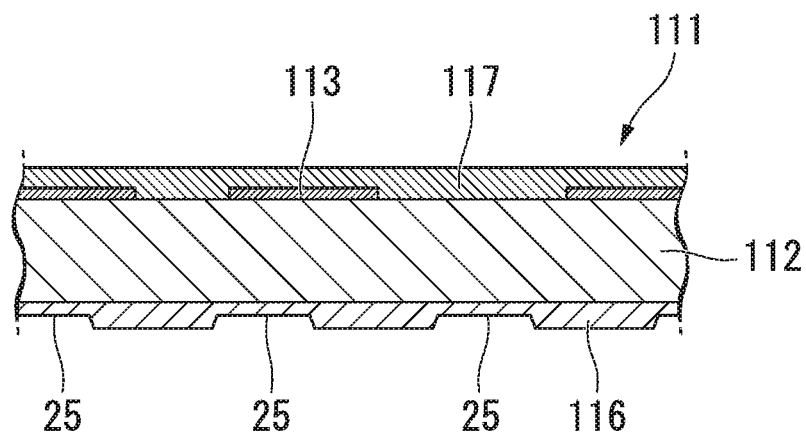
FIG. 7 is a sectional view in a thickness direction showing one form of an in-mold label of a blow-molded container with an in-mold label shown as a comparative example related to the invention.

The in-mold label 111 of type E, as shown in FIG. 7, includes a base material layer 112 made of synthetic paper, a printing layer 113 formed by flexographic printing being performed on the surface of the base material layer 112, a protective layer 117 made of transparent varnish that covers the printing layer 113, and a glue layer 116 consisting of a heat-sealing layer arranged on a back surface of the base material layer 112. The depth of the recesses 25 falls within the thickness range of the glue layer 116.

Figure 8:
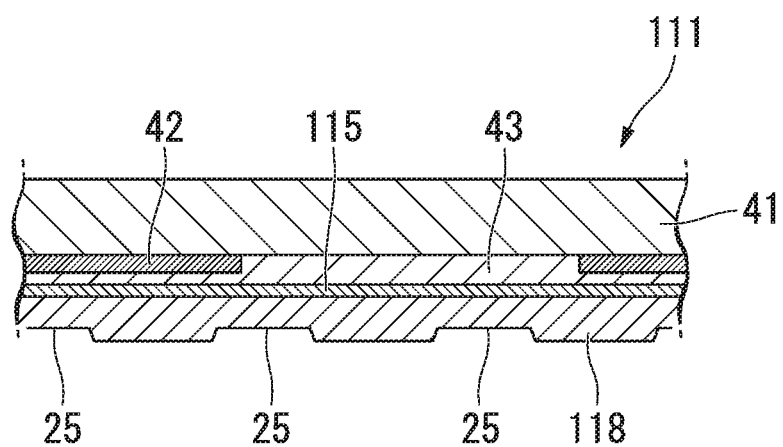
FIG. 8 is a sectional view in the thickness direction showing another form of the in-mold label of the blow-molded container with an in-mold label shown as the comparative example related to the invention.

In addition, the thickness of the base material layer 112 is about 0.080 mm. The in-mold label 111 of F type, as shown in FIG. 8, is formed such that the base material layer 41, the printing layer 42 formed by gravure printing being performed on the back surface of the base material layer 41, the anchor coat layer 43, a dry lamination layer 115, a glue layer 118 made of copolymerized polypropylene resin are laminated in this order toward a back surface side from a front surface side. The depth of the recesses 25 falls within the thickness range of the glue layer 118.

In addition, the thickness of the base material layer 41 is about 0.060 mm, and the thickness of the glue layer 118 is about 0.030 mm.

The configuration of the in-mold labels 16 and 111 of the aforementioned type A to type F is shown in Table 1.

In Table 1, "Thickness" shows the thickness of portions where the recesses 25 are not formed in the in-mold labels 16 and 111, "Depth" shows the depth of the recesses 25, "Plane Area Proportion" shows the proportion of the total plane area occupied by the multiple recesses 25 of the in-mold labels 16 and 111, "Number of Pieces" shows the number of the recesses 25 that are located in a unit region where a plane area is 1 cm$^2$, in the in-mold labels 16 and 111, and "Internal Volume" shows the total of the internal volume of all of the plurality of recesses 25 that are located in the unit region where the plane area is 1 cm$^2$, in the in-mold labels 16 and 111.

At least one of the type of the in-mold labels 16 and 111, R×θ$^2$ in the container body, and the presence/absence of the first intake passages 33 in the molds 31 and 32 was changed, 20 types of blow-molded containers with an in-mold label were formed, and whether or not air collection occurred between the in-mold labels 16 and 111 and the corner surfaces of the body portion was visually determined and evaluated for each of the containers.

The results are shown in Table 2.

In Table 2, cases where the evaluation results are O show that air collection could not be visually recognized in the in-mold labels 16 and 111 at all, cases where the evaluation results are Δ show that slight air collection can be visually recognized but do not exert an influence on external appearance quality, and cases where the evaluation results are x show that air collection could be visually recognized clearly.

TABLE 1

| Type | Thickness Before Gluing t (mm) | Depth (mm) Before Gluing | Depth (mm) After Gluing | Plane Area Proportion (%) | Number of Pieces (Pieces/1 cm$^2$) | Internal Volume Before Gluing (cm$^3$/1 cm$^2$) | E × t$^3$ (MPa·mm$^3$) Container Axial Direction | E × t$^3$ (MPa·mm$^3$) Circumferential Direction | Material of Container Body |
|---|---|---|---|---|---|---|---|---|---|
| A | 0.085 | 0.060 | 0.030 | 46 | 324 | 0.00200 | 0.142 | 0.130 | High-Density Polyethylene |
| B | 0.085 | 0.075 | 0.040 | 46 | 324 | 0.00250 | 0.150 | 0.145 | Polypropylene |
| C | 0.095 | 0.040 | 0.025 | 46 | 324 | 0.00130 | 0.124 | 0.096 | Polypropylene |
| D | 0.065 | 0.020 | 0.015 | 46 | 324 | 0.00110 | 0.073 | 0.068 | High-Density Polyethylene |
| E | 0.090 | 0.010 | less than 0.010 | 30 | 400 | 0.00020 | 0.536 | 0.283 | Polypropylene |
| F | 0.095 | 0.015 | less than 0.010 | 25 | 400 | 0.00030 | 0.378 | 0.339 | High-Density Polyethylene |

TABLE 2

| | Angle θ (°) | Radius of Curvature R (mm) | R × θ$^2$ | Type of In-Mold Label | Presence/Absence of First Intake Passage | Evaluation Result |
|---|---|---|---|---|---|---|
| Example 1 | 110 | 6.0 | 72600 | A | Yes | O |
| Example 2 | 90 | 12.5 | 101250 | A | Yes | O |
| Example 3 | 60 | 12.5 | 45000 | A | Yes | O |
| Example 4 | 110 | 6.0 | 72600 | B | Yes | O |
| Example 5 | 90 | 12.5 | 101250 | B | Yes | O |
| Example 6 | 60 | 12.5 | 45000 | B | Yes | O |
| Example 7 | 110 | 6.0 | 72600 | C | Yes | O |
| Example 8 | 90 | 12.5 | 101250 | C | Yes | O |
| Example 9 | 60 | 12.5 | 45000 | C | Yes | O |
| Example 10 | 110 | 6.0 | 72600 | D | Yes | O |
| Example 11 | 90 | 12.5 | 101250 | D | Yes | O |
| Example 12 | 60 | 12.5 | 45000 | D | Yes | O |
| Example 13 | 110 | 6.0 | 72600 | A | No | Δ |
| Example 14 | 90 | 12.5 | 101250 | A | No | Δ |
| Comparative Example 1 | 90 | 5.0 | 40500 | A | Yes | x |
| Comparative Example 2 | 60 | 6.0 | 21600 | A | Yes | x |
| Comparative Example 3 | 110 | 6.0 | 72600 | E | Yes | x |
| Comparative Example 4 | 90 | 12.5 | 101250 | E | Yes | x |
| Comparative Example 5 | 110 | 6.0 | 72600 | F | Yes | x |
| Comparative Example 6 | 90 | 12.5 | 101250 | F | Yes | x |

As a result, in the blow-molded containers 1 with an in-mold label including the in-mold labels 16 of type A to D and the container body 15 in which $E \times t^3$ is 0.20 or less and $R \times \theta^2$ is 45000 or more, it was confirmed that air collection does not occur in the in-mold labels 16, or external appearance quality is not influenced even if air collection occurs.

The invention is not limited to the above embodiment, and can be appropriately changed without departing from the concept of the invention.

For example, in the above embodiment, the in-mold labels 16 are respectively glued on the portions ranging from the maximum corner surface 21 to the respective planar portions 20 continuing on both sides of the maximum corner surface 21 around the container axis O, and the portions ranging from the opposite corner surface 22 to the respective planar portions 20 continuing on both sides of the opposite corner surface 22 around the container axis O, in the outer peripheral surface of the body portion 12. However, instead of this, the in-mold labels may be limitedly glued on the portions ranging from one of the corner surfaces 21 and 22 to the respective planar portions 20 continuing on both sides of this corner surface around the container axis O, in the outer peripheral surface of the body portion 12.

Additionally, in the above embodiment, the curvature radius R of one corner surface 21 among the four corner surfaces 21 to 24 is made greater than that of the other three corner surfaces 22 to 24. However, the curvature radii R of all the four corner surfaces 21 to 24 may be altogether made equal to each other, and may be altogether make different from each other.

Additionally, instead of the above embodiment, the pair of molds 31 and 32 may be disposed so that the portioning line is located in the set of planar portions 20 that face each other in the body portion 12 of the container body 15, and the in-mold labels 16 may be glued on the portions ranging to the respective corner surfaces 21 to 24 continuing on both sides of the planar portions 20 around the container axis O at the positions where the portioning line is avoided, in the outer peripheral surface of the body portion 12. In addition, in this blow-molded container with an in-mold label, the portioning line may be located at central portions of the planar portions 20 around the container axis O.

Additionally, the cross-sectional view shape of the body portion 12 orthogonal to the container axis O is not limited to the rectangular shape, and may be other angular shapes.

Additionally, in the above embodiment, the body portion 12 is formed in a prismatic shape. However, the shape of the body portion may be appropriately changed to, for example, a pyramidal shape, a truncated pyramidal shape, or the like.

Additionally, the thickness of the in-mold labels 16, the depth of the recesses 25, or the like is not limited to the above embodiment, and may be appropriately changed.

In addition, the constituent elements in the above embodiment can be substituted with well-known constituent elements without departing from the concept of the invention, and the above modification examples may be appropriately combined together.

INDUSTRIAL APPLICABILITY

According to the invention, a blow-molded container with an in-mold label in which air collection does not easily occur between the corner surfaces and the in-mold labels can be manufactured.

REFERENCE SIGNS LIST

1: BLOW-MOLDED CONTAINER WITH 1N-MOLD LABEL
11: BOTTOM PORTION
11a: GROUNDING PORTION
12: BODY PORTION
13: SHOULDER PORTION
14: MOUTH PORTION
15: CONTAINER BODY
16, 111: IN-MOLD LABEL
16a: CORRESPONDING PORTION
20: PLANAR PORTION
21, 22, 23, 24: CORNER SURFACE
25: RECESS
30: MOLDING MOLD
31, 32: MOLD
31a, 32a: MOLD SURFACE
33: FIRST INTAKE PASSAGE
34: SECOND INTAKE PASSAGE
41, 112: BASE MATERIAL LAYER
42, 113: PRINTING LAYER
43: ANCHOR COAT LAYER
44, 46, 116, 118: GLUE LAYER
45, 117: PROTECTIVE LAYER
47: EXTRUSION RESIN LAYER
48: FIRST FILM
49: SECOND FILM
115: DRY LAMINATION LAYER
C: CAVITY
O: CONTAINER AXIS
W: PARISON (PRELIMINARY MOLDED BODY)

The invention claimed is:

1. A blow-molded container with an in-mold label, comprising:
    a container body having a body portion that forms a square shape in which planar portions and corner surfaces are alternately and continuously provided around a container axis, in a cross-sectional view orthogonal to the container axis; and
    in-mold labels, adhering on outer peripheral surfaces of adhesion portions in the body portion, the adhesion portions being positioned at the corner surfaces and at the planar portions which are positioned continuously to the corner surfaces in the container axis,
    wherein, among front and back surfaces of the in-mold labels, multiple recesses are formed over the entire back surfaces of the in-mold labels which are adhered to the outer peripheral surfaces of the adhesion portions,
    wherein $E \times t^3$ is 0.20 or less, where the tensile elasticity of the in-mold labels is E (MPa) and the thickness of the in-mold labels is t (mm), and
    wherein $R \times \theta^2$ is 45000 or more, where the radius of curvature of the corner surfaces is R (mm) and the angle formed between the planar portions is $\theta$ (°) in a cross-sectional view of the adhesion portions.

2. The blow-molded container with an in-mold label according to claim 1,
    wherein a depth of each of the multiple recesses is 0.01 mm or more, and a proportion of a sum of a total plane area occupied by each of the multiple recesses to a total plane area of the in-mold labels is 10% or more.

3. A method for manufacturing a blow-molded container with an in-mold label including
    a container body having a body portion that forms a square shape in which planar portions and corner surfaces are alternately and continuously provided around a container axis, in a cross-sectional view orthogonal to the container axis; and in-mold labels, adhering on outer peripheral surfaces of adhesion portions in the body portion, the adhesion portions being positioned at the corner surfaces and the planar portions which are positioned continuously to the corner surfaces in the container axis, the method comprising:

a setting process of arranging a preliminary molded body and the in-mold labels within a cavity; and a blow-molding process of blow-molding the preliminary molded body to form the container body and adhering the in-mold labels on the outer peripheral surfaces of the adhesion portions, wherein, among front and back surfaces of the in-mold labels, multiple recesses are formed over the entire back surfaces of the in-mold labels which are adhered to the outer peripheral surfaces of the adhesion portions, wherein $E \times t^3$ satisfies 0.20 or less, wherein the tensile elasticity of the in-mold labels is E (MPa) and the thickness of the in-mold labels is t (mm), and wherein $R \times \theta^2$ is 45000 or more, where the radius of curvature of the corner surfaces is R (mm) and an angle formed between the planar portions is $\theta$ (°) in a cross-sectional view of the adhesion portions.

4. The method for manufacturing a blow-molded container with an in-mold label according to claim 3, wherein the proportion of a sum of a total plane area occupied by each of the multiple recesses to a total plane area of the in-mold labels is 10% or more, and a depth of each of the multiple recesses is 0.02 mm or more in a state before the in-mold labels are adhered on an outer peripheral surface of the body portion.

5. The method for manufacturing a blow-molded container with an in-mold label according to claim 3, wherein corresponding portions adhered on outer peripheral surfaces of the corner surfaces in the in-mold labels are stuck on an inner surface of the cavity in the blow molding process.

6. The method for manufacturing a blow-molded container with an in-mold label according to claim 4, wherein corresponding portions adhered on outer peripheral surfaces of the corner surfaces in the in-mold labels are stuck on an inner surface of the cavity in the blow molding process.

* * * * *